US009567889B2

(12) United States Patent
Nogi

(10) Patent No.: US 9,567,889 B2
(45) Date of Patent: Feb. 14, 2017

(54) EXHAUST PURIFICATION SYSTEM FOR INTERNAL COMBUSTION ENGINE

(71) Applicant: Yoshito Nogi, Toyota (JP)

(72) Inventor: Yoshito Nogi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/127,093

(22) PCT Filed: Apr. 19, 2013

(86) PCT No.: PCT/JP2013/061651
§ 371 (c)(1),
(2) Date: Dec. 17, 2013

(87) PCT Pub. No.: WO2014/171012
PCT Pub. Date: Oct. 23, 2014

(65) Prior Publication Data

US 2016/0032811 A1 Feb. 4, 2016

(51) Int. Cl.
*F01N 3/00* (2006.01)
*F01N 3/10* (2006.01)
(Continued)

(52) U.S. Cl.
CPC ............... *F01N 3/36* (2013.01); *F01N 3/0814* (2013.01); *F01N 3/0842* (2013.01);
(Continued)

(58) Field of Classification Search
CPC .... F01N 3/0814; F01N 3/0842; F01N 3/0871; F01N 3/206; F01N 3/36; F01N 2610/03; F01N 2610/146; F01N 2610/1493; F01N 2430/06; F02D 41/0235; F02D 41/30; F02D 41/405
(Continued)

(56) References Cited

U.S. PATENT DOCUMENTS 8,336,296 B2 * 12/2012 Nakatani ............ B01D 53/9409 60/285
2009/0007545 A1 1/2009 Kameda
(Continued)

FOREIGN PATENT DOCUMENTS

EP 1 331 373 A2 7/2003
JP A-2003-222019 8/2003
(Continued)

*Primary Examiner* — Thomas Denion
*Assistant Examiner* — Diem Tran
(74) *Attorney, Agent, or Firm* — Oliff PLC

(57) ABSTRACT

In an internal combustion engine, an exhaust purification catalyst and a hydrocarbon feed valve are arranged in an exhaust passage. When the air-fuel ratio of the exhaust gas which flows into the exhaust purification catalyst should be made rich, rich control, which makes the air-fuel ratio of the exhaust gas which is exhausted from the combustion chamber rich, is performed. In order to prevent clogging of the hydrocarbon feed valve, clogging preventing injection which injects hydrocarbons from the hydrocarbon feed valve by an injection interval ΔtCB is performed. The exhaust purification catalyst has an oxygen storage ability. At the initial period of rich control, clogging preventing injection is performed by a shorter injection interval ΔtCS.

17 Claims, 18 Drawing Sheets

(51) Int. Cl.

| | |
|---|---|
| ***F01N 3/36*** | (2006.01) |
| ***F02D 41/40*** | (2006.01) |
| ***F02D 41/02*** | (2006.01) |
| ***F01N 3/08*** | (2006.01) |
| ***F01N 3/20*** | (2006.01) |
| ***F02D 41/30*** | (2006.01) |

(52) U.S. Cl.
CPC ........... *F01N 3/0871* (2013.01); *F01N 3/206* (2013.01); *F02D 41/0235* (2013.01); *F02D 41/30* (2013.01); *F02D 41/405* (2013.01); *F01N 2430/06* (2013.01); *F01N 2610/03* (2013.01); *F01N 2610/146* (2013.01); *F01N 2610/1493* (2013.01); *Y02T 10/44* (2013.01)

(58) Field of Classification Search
USPC .......................................... 60/286, 295, 303
See application file for complete search history.

(56) References Cited

U.S. PATENT DOCUMENTS

| | | | |
|---|---|---|---|
| 2009/0151332 | A1 | 6/2009 | Toshioka et al. |
| 2010/0251697 | A1 | 10/2010 | Nakatani et al. |
| 2013/0017121 | A1 | 1/2013 | Bisaiji et al. |

FOREIGN PATENT DOCUMENTS

| | | | |
|---|---|---|---|
| JP | A-2006-291821 | | 10/2006 |
| JP | A-2009-138731 | | 6/2009 |
| JP | A-2009-174445 | | 8/2009 |
| WO | 2009/053806 | A2 | 4/2009 |
| WO | WO 2013/008342 | A1 | 1/2013 |

* cited by examiner

EXHAUST PURIFICATION SYSTEM FOR INTERNAL COMBUSTION ENGINE

TECHNICAL FIELD

The present invention relates to an exhaust purification system for an internal combustion engine.

BACKGROUND ART

Known in the art is an exhaust purification system for an internal combustion engine in which an NOx storage catalyst is arranged in an engine exhaust passage and a hydrocarbon feed valve is arranged upstream of the NOx storage catalyst in the engine exhaust passage and in which rich control which makes an air-fuel ratio of the exhaust gas which is exhausted from a combustion chamber rich is performed to release NOx from the NOx storage catalyst and remove the NOx, and clogging preventing injection which injects hydrocarbons from the hydrocarbon feed valve is performed during the rich control to prevent clogging of the hydrocarbon feed valve (for example, see PLT 1). In this exhaust purification system, clogging preventing injection is performed when the NOx release speed is high during the rich control, that is, in the middle period of rich control. Note that, the NOx storage catalyst of this exhaust purification system contains ceria. Therefore, the NOx storage catalyst has an oxygen storage ability.

CITATION LIST

Patent Literature

PLT 1: Japanese Patent Publication No. 2009-174445A

SUMMARY OF INVENTION

Technical Problem

However, when the NOx storage catalyst has an oxygen storage ability, for a little while after rich control is started, the oxygen which is stored in the NOx storage catalyst is released. While the oxygen is being released, almost no NOx is released. In other words, time is required from when rich control is started to when NOx substantially starts to be released. For this reason, completing rich control quickly becomes difficult and the fuel consumption amount is liable to increase.

An object of the present invention is to provide an exhaust purification system for an internal combustion engine which can reliably prevent clogging of the hydrocarbon feed valve while shortening the time required for rich control.

Solution to Problem

According to the present invention, there is provided an exhaust purification system for an internal combustion engine in which an exhaust purification catalyst is arranged inside of an engine exhaust passage and a hydrocarbon feed valve is arranged upstream of the exhaust purification catalyst in the engine exhaust passage, rich control which makes the air-fuel ratio of the exhaust gas which is exhausted from a combustion chamber rich is performed when the air-fuel ratio of the exhaust gas which flows into the exhaust purification catalyst should be made rich, and clogging preventing injection which injects hydrocarbons from the hydrocarbon feed valve by a predetermined injection interval in order to prevent clogging of the hydrocarbon feed valve, in which exhaust purification system, the exhaust purification catalyst has an oxygen storage ability and the clogging preventing injection is performed by an injection interval which is shorter than the predetermined injection interval at the initial period of rich control.

Advantageous Effects of Invention

It is possible to reliably prevent clogging of the hydrocarbon feed valve while shortening the time required for rich control.

DESCRIPTION OF EMBODIMENTS

Figure 1:
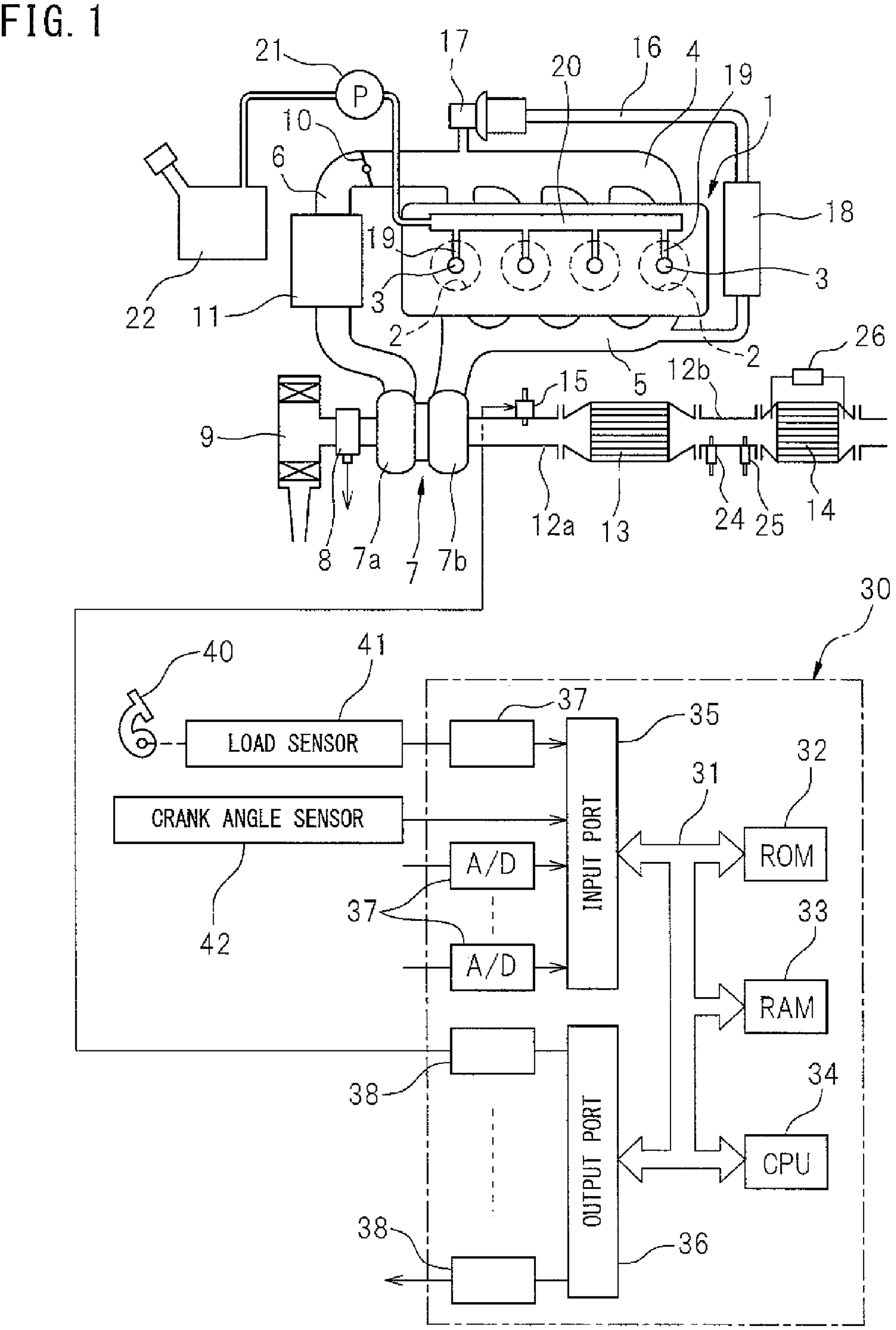
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7*a* of an exhaust turbocharger 7, while an inlet of the compressor 7*a* is connected through an intake air amount detector 8 to an air cleaner 9. Inside the intake duct 6, a throttle valve 10 which is driven by an actuator is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7*b* of the exhaust turbocharger 7. An outlet of the exhaust turbine 7*b* is connected through an exhaust pipe 12*a* to an inlet of the exhaust purification catalyst 13. In the embodiment according to the present invention, this exhaust purification catalyst 13 is comprised of an NOx storage catalyst. An outlet of the exhaust purification catalyst 13 is connected through an exhaust pipe 12*a* to a particulate filter 14. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the TOR gas. Each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13 in the exhaust pipe 12*b*, a temperature sensor 24 for detecting the temperature of the exhaust gas which flows out from the exhaust purification catalyst 13 is attached. The temperature of the exhaust gas which flows out from the exhaust purification catalyst 13 expresses the temperature of the exhaust purification catalyst 13. Further, the exhaust pipe 12*b* has an air-fuel ratio sensor 25 attached to it for detecting the air-fuel ratio of the exhaust gas which flows out from the exhaust purification catalyst 13.

Further, at the particulate filter 14, a differential pressure sensor 26 for detecting a differential pressure before and after the particulate filter 14 is attached. The output signals of these temperature sensor 24, air-fuel ratio sensor 25, differential pressure sensor 26, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator for driving the throttle valve 10, hydrocarbon feed valve 15, FGR control valve 17, and fuel pump 21.

Figure 2:
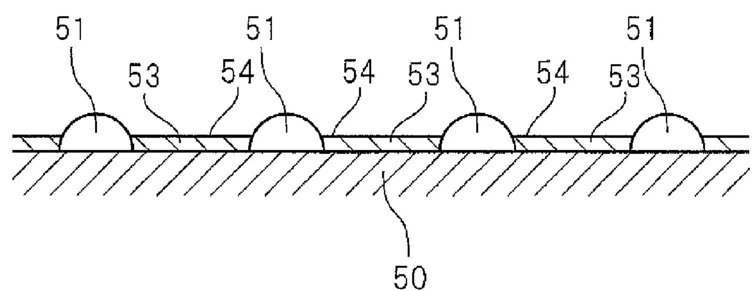
FIG. 2 is a view which schematically shows a surface part of a catalyst carrier.

FIG. 2 schematically shows a surface part of a catalyst carrier which is carried on a substrate of the exhaust purification catalyst 13 which is shown in FIG. 1. At this exhaust purification catalyst 13, as shown in FIG. 2, for example, there is provided a catalyst carrier 50 made of alumina on which a precious metal catalyst 51 is carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to NOx. This basic layer 53 is made to contain ceria $CeO_2$. Therefore, the exhaust purification catalyst 13 has an oxygen storage ability. Further, the catalyst carrier 50 of the exhaust purification catalyst 13 can be made to carry not only platinum Pt, but also rhodium Rh or palladium Pd. Note that the exhaust gas flows along the top of the catalyst carrier 50, so the precious metal catalyst 51 can be said to be carried on the exhaust gas flow surface of the exhaust purification catalyst 13. Further, the surface of the basic layer 53 exhibits basicity, so the surface of the basic layer 53 is called the "basic exhaust gas flow surface part 54".

Figure 3:
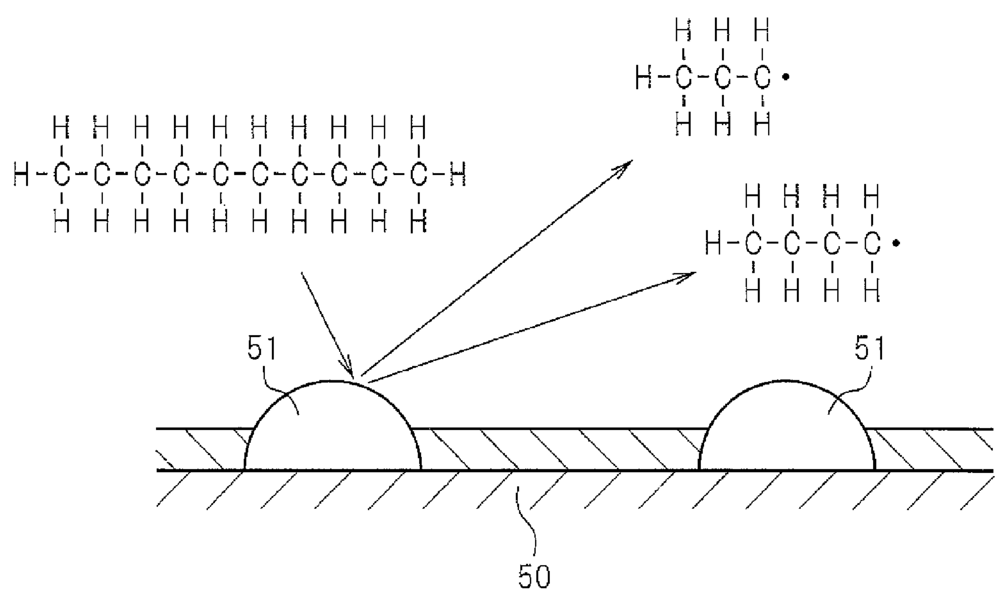
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the NOx at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the precious metal catalyst 51.

Figure 4:
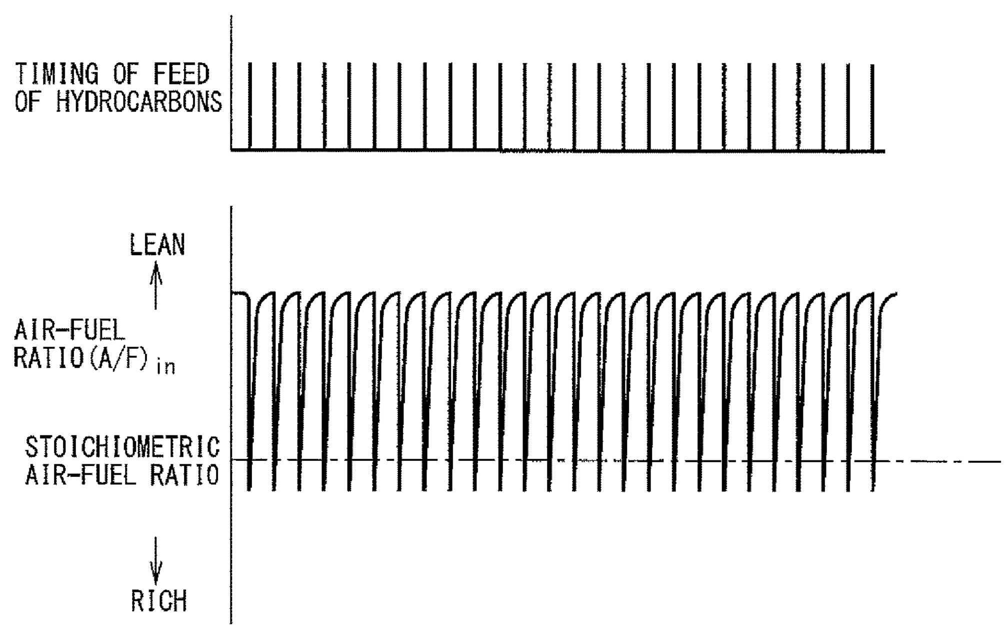
FIG. 4 is a view showing a change of an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F)in becomes, the higher the hydrocarbon concentration.

Figure 5:
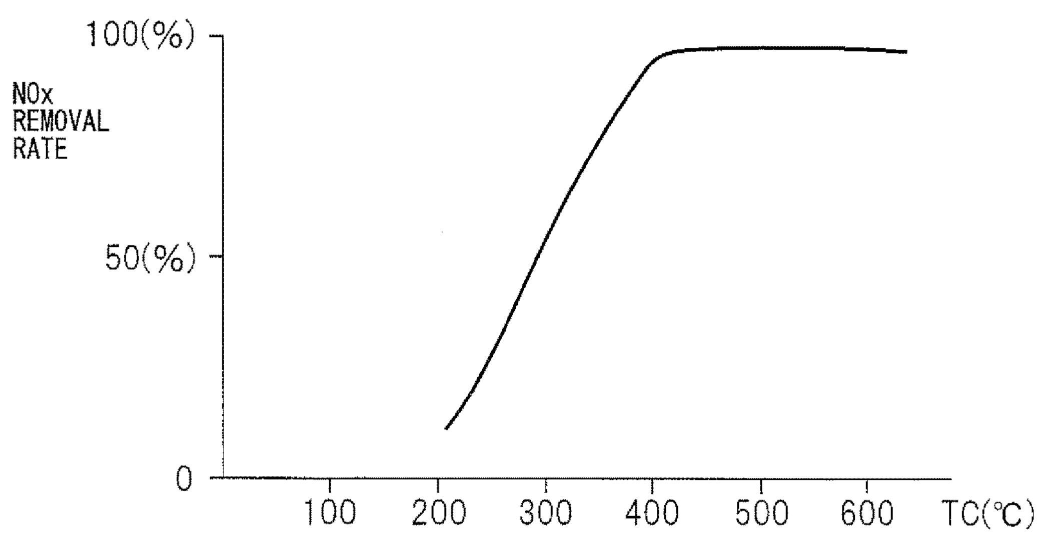
FIG. 5 is a view which shows an NOx removal rate.

FIG. 5 shows the NOx removal rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F)in of the exhaust gas flowing to the exhaust purification catalyst 13 rich. The inventors engaged in research relating to NOx removal for a long time. As a result, they learned that if making the concentration of hydrocarbons which flow into the exhaust purification catalyst 13 vibrate by within a predetermined range of amplitude and within a predetermined range of period, as shown in FIG. 5, an extremely high NOx removal rate is obtained even in a 400° C. or higher high temperature region.

Figure 6A:
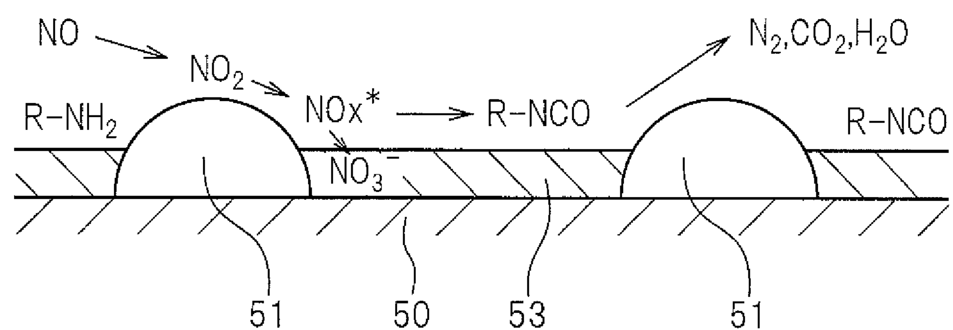
FIGS. 6A and 6B are views for explaining an oxidation reduction reaction in an exhaust purification catalyst.
Figure 6B:
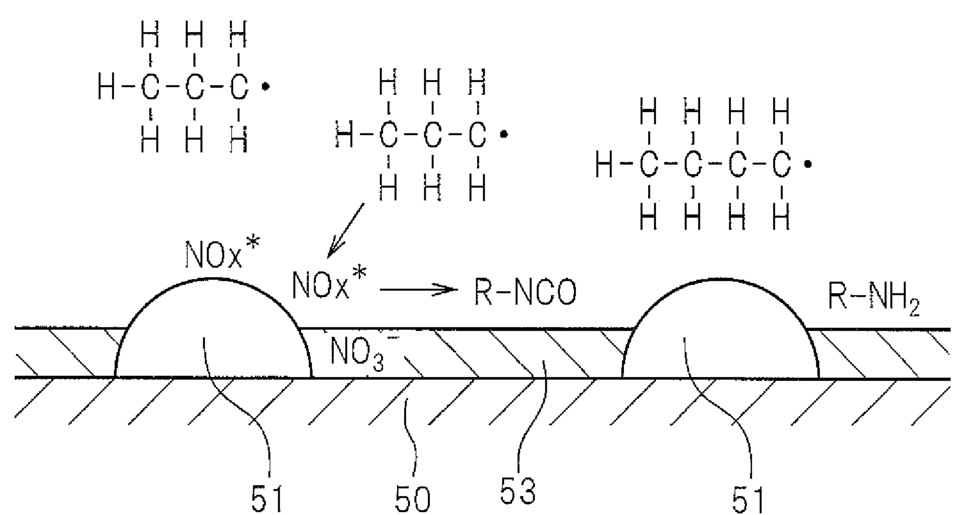

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high NOx removal rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F)in of the exhaust gas flowing into the exhaust purification catalyst 13 is made rich, that is, when the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2$. Therefore, on the platinum Pt 51, $NO_3$ and $NO_2^-$ are produced. The NO which is deposited on the exhaust purification catalyst 13 and the $NO_2^-$ and $NO_3$ which are produced on the platinum Pt 51 are strong in activity. Therefore, below, these NO, $NO_2^-$, and $NO_3$ will be referred to as the active $NOx^*$.

On the other hand, if hydrocarbons are fed from the hydrocarbon feed valve 15 and the air-fuel ratio (A/F)in of the exhaust gas which flows into the exhaust purification catalyst 13 is made rich, the hydrocarbons are successively deposited on the exhaust purification catalyst 13 as a whole. The majority of the deposited hydrocarbons is successively reacted with the oxygen and made to burn. Part of the deposited hydrocarbons successively, as shown in FIG. 3, is reformed and become radicalized inside of the exhaust purification catalyst 13. Therefore, as shown in FIG. 6B, the hydrogen concentration around the active $NOx^*$ becomes higher. In this regard, if, after the active $NOx^*$ is produced, the state of a high oxygen concentration around the active $NOx^*$ continues far a constant time or more, the active $NOx^*$ is oxidized and is absorbed in the form of nitrate ions $NO_3^-$ inside the basic layer 53. However, if, before this constant time elapses, the hydrocarbon concentration around the active $NOx^*$ becomes higher, as shown in FIG. 6B, the active $NOx^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R-$NO_2$. If this nitro compound R-$NO_2$ is produced, the result becomes a nitrile compound R-CN, but this nitrile compound R-CN can only survive for an instant in this state, so immediately becomes an isocyanate compound R-NCO. This isocyanate compound R-NCO, when hydrolyzed, becomes an amine compound R-$NH_2$. However, in this case, what is hydrolyzed is considered to be part of the isocyanate compound R-NCO. Therefore, as shown in FIG. 63, the majority of the reducing intermediate which is held or adsorbed on the surface of the basic layer 53 is believed to be the isocyanate compound R-NCO and amine compound R-$NH_2$.

On the other hand, as shown in FIG. 63, if the produced reducing intermediate is surrounded by the hydrocarbons HC, the reducing intermediate is blocked by the hydrocarbons HO and the reaction will not proceed any further. In this case, if the concentration of hydrocarbons which flow into the exhaust purification catalyst 13 is lowered and next the hydrocarbons which are deposited around the reducing intermediate are oxidized and consumed and thereby the oxygen concentration around the reducing intermediate becomes higher, the reducing intermediate will react with the NOx in the exhaust gas or the active $NOx^*$ or will react with the surrounding oxygen or will break down by itself. Due to this, the reducing intermediate R-NCO or R-$NH_2$, as shown in FIG. 6A, will be changed to $N_2$, $CO_2$, and $H_2O$, therefore the NOx will be removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered, then the oxygen concentration is raised. At this time, the reducing intermediate reacts with the NOx in the exhaust gas or the active $NOx^*$ or breaks down by itself, whereby the NOx is removed. That is, in order for the exhaust purification catalyst 13 to remove the NOx, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the NOx in the exhaust gas or active $NOx^*$ or make it break down by itself. That is, it is necessary to make the concentration of hydrocarbons which flows into the exhaust purification catalyst 13 vibrate by within a predetermined range of amplitude. Note that, in this case, it is necessary to hold these produced reducing intermediate R-NCO or R-$NH_2$ on the basic layer 53, that is, the basic exhaust gas flow surface part 54, until the reducing intermediate reacts with the NOx in the exhaust gas or active $NOx^*$ or breaks down by itself. For this reason, the basic exhaust gas flow surface part 54 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NOx^*$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the NOx contained in the exhaust gas and the reformed hydrocarbons react and produce the reducing intermediate R-NCO or R-$NH_2$ containing nitrogen and hydrocarbons, a precious metal catalyst 51 is carried on the exhaust gas flow surface of the exhaust purification catalyst 13. To hold the produced reducing intermediate R-NCO or R-$NH_2$ inside the exhaust purification catalyst 13, basic exhaust gas flow surface parts 54 are formed around the precious metal catalyst 51. The reducing intermediate R-NCO or R-$NH_2$ held on the basic exhaust gas flow surface part 54 is converted to $N_2$, $CO_2$, and $H_2O$ and the vibration period of the hydrocarbon concentration is made the vibration period required for continuation of the production of the reducing intermediate R-NCO or R-$NH_2$. Incidentally, in the example shown in FIG. 4, the injection interval is made 3 seconds.

Figure 7A:
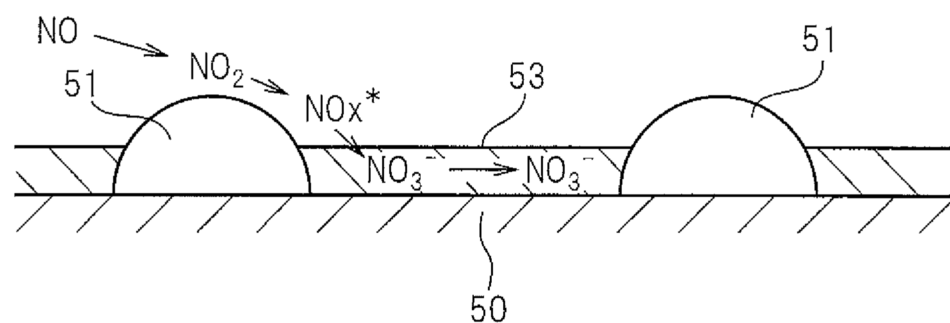
FIGS. 7A and 7B are views for explaining an oxidation reduction reaction in an exhaust purification catalyst.

If the vibration period of the hydrocarbon concentration, that is, the injection period of the hydrocarbons HC from the hydrocarbon feed valve 15, is made longer than the above predetermined range of period, the reducing intermediate R-NCO or R-$NH_2$ disappears from the surface of the basic layer 53. At this time, the active $NOx^*$ which is produced on the platinum Pt 53, as shown in FIG. 7A, diffuses in the basic layer 53 in the form of nitrate ions $NO_3^-$and becomes nitrates. That is, at this time, the NOx in the exhaust gas is absorbed in the form of nitrates inside of the basic layer 53.

Figure 7B:
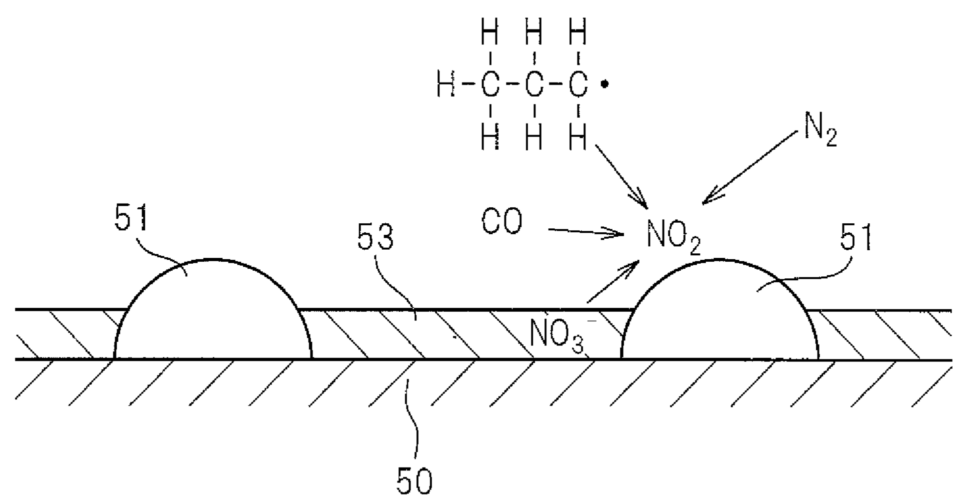

On the other hand, FIG. 7B shows the case where the air-fuel ratio of the exhaust gas which flows into the exhaust purification catalyst 13 is made the stoichiometric air-fuel ratio or rich when the NOx is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$and, as shown in FIG. 7B, are released from the basic layer 53 in the form of $NO_2$. Next, the released $NO_2$ is reduced by the hydrocarbons HC and CO contained in the exhaust gas.

Figure 8:
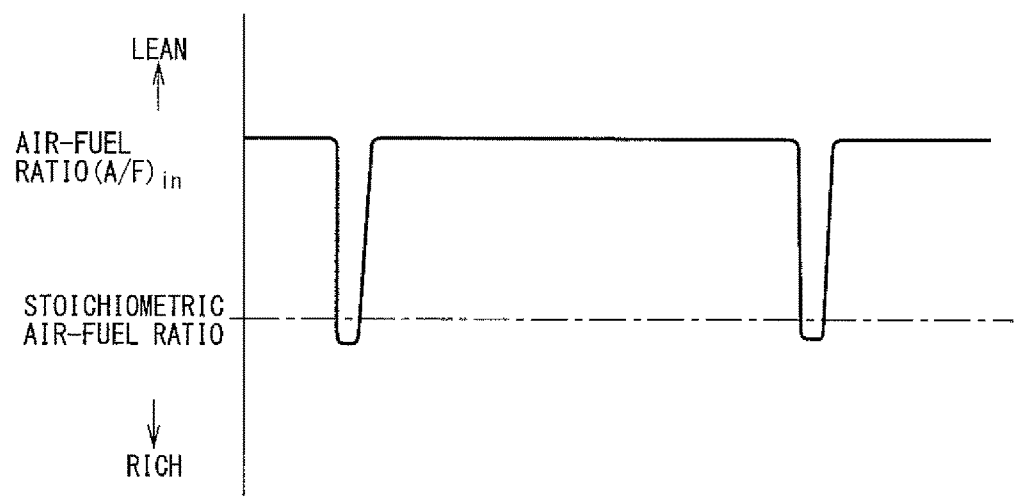
FIG. 8 is a view showing a change of an air-fuel ratio of exhaust gas which flows into an exhaust purification catalyst.

FIG. 8 shows the case of making the air-fuel ratio (A/F)in of the exhaust gas which flows into the exhaust purification catalyst 13 temporarily rich slightly before the NOx absorption ability of the basic layer 53 becomes saturated. Note that, in the example shown in FIG. 8, the time interval of this rich control is 1 minute or more. In this case, the NOx which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing NOx.

Note that, at this time, sometimes the basic layer 53 temporarily adsorbs the NOx. Therefore, if using term of storage as a term including both absorption and adsorption, at this time, the basic layer 53 performs the role of an NOx storage agent for temporarily storing the NOx. That is, in this case, if the ratio of the air and fuel (hydrocarbons) which are supplied into the engine intake passage, combustion chambers 2, and exhaust passage upstream of the exhaust purification catalyst 13 is referred to as the "air-fuel ratio of the exhaust gas", the exhaust purification catalyst 13 functions as an NOx storage catalyst which stores the NOx when the air-fuel ratio of the exhaust gas is lean and releases the stored NOx when the oxygen concentration in the exhaust gas falls.

Figure 9:
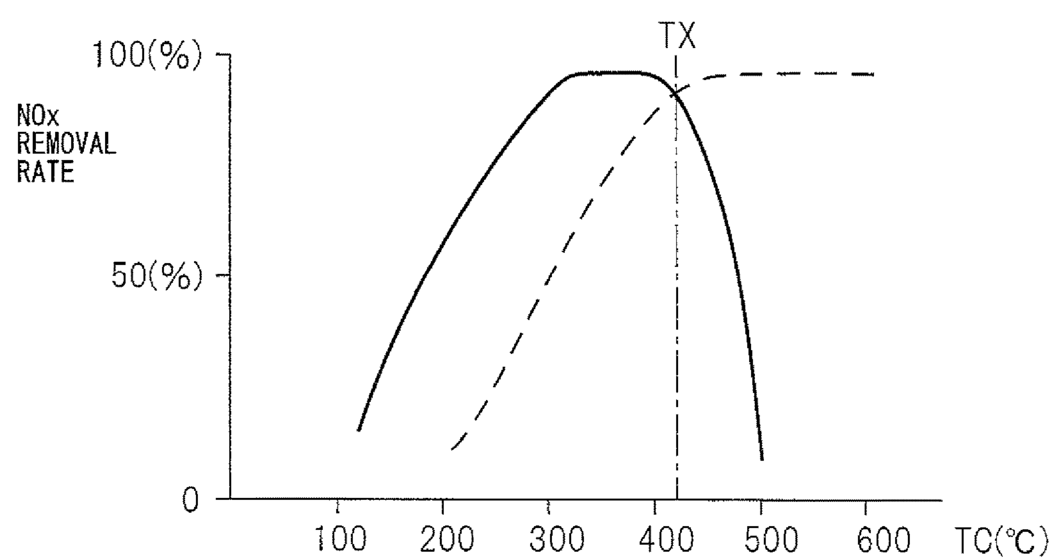
FIG. 9 is a view of an NOx removal rate.

The solid line of FIG. 9 shows the NOx removal rate when making the exhaust purification catalyst 13 function as an NOx storage catalyst in this way. Note that, the abscissa of the FIG. 9 shows the catalyst temperature TC of the exhaust purification catalyst 13. When making the exhaust purification catalyst 13 function as an NOx storage catalyst, as shown in FIG. 9 by the solid line, when the catalyst temperature TC is 300° C. to 400° C., an extremely high NOx removal rate is obtained, but when the catalyst temperature TC becomes a 400° C. or higher high temperature, the NOx removal rate falls. Note that FIG. 9 shows the NOx removal rate which is shown in FIG. 5 by the broken line.

In this way, when the catalyst temperature TC becomes 400° C. or more, the NOx removal rate falls because if the catalyst temperature TC becomes 400° C. or more, the nitrates break down by heat and are released in the form of $NO_2$ from the exhaust purification catalyst 13. That is, so long as storing NOx in the form of nitrates, when the catalyst temperature TC is high, it is difficult to obtain a high NOx removal rate. However, in the new NOx removal method shown from FIG. 4 to FIG. 63, as will be understood from FIGS. 6A and 6B, nitrates are not formed or even if formed are extremely fine in amount, consequently, as shown in FIG. 5, even when the catalyst temperature TC is high, a high NOx removal rate is obtained.

In this embodiment according to the present invention, this new NOx removal method is used to be able to remove NOx by provision of a system where a hydrocarbon feed valve 15 for feeding hydrocarbons is arranged inside of an engine exhaust passage, an exhaust purification catalyst 13 is arranged in the engine exhaust passage downstream of the hydrocarbon feed valve 15, a precious metal catalyst 51 is carried on the exhaust gas flow surface of the exhaust purification catalyst 13, basic exhaust gas flow surface parts 54 are formed around the precious metal catalyst 51, the exhaust purification catalyst 13 has the property of reducing the NOx which is contained in exhaust gas if the concentration of hydrocarbons which flow into the exhaust purification catalyst 13 is made to vibrate within a predetermined range of amplitude and within a predetermined range of period and has the property of being increased in storage amount of NOx which is contained in exhaust gas if the vibration period of the hydrocarbon concentration is made longer than this predetermined range, and, at the time of engine operation, hydrocarbons are injected from the hydrocarbon feed valve 15 by a period within the predetermined range to thereby reduce the NOx which is contained in the exhaust gas in the exhaust purification catalyst 13.

That is, the NOx removal method which is shown from FIG. 4 to FIG. 6B can be said to be a new NOx removal method designed to remove NOx without forming almost any nitrates in the case of using an exhaust purification catalyst which carries a precious metal catalyst and forms a basic layer which can absorb NOx. In actuality, when using this new NOx removal method, the nitrates which are detected from the basic layer 53 become much smaller in amount compared with the case where making the exhaust purification catalyst 13 function as an NOx storage catalyst. Note that, this new NOx removal method will be referred to below as the "first NOx removal method".

Figure 10:
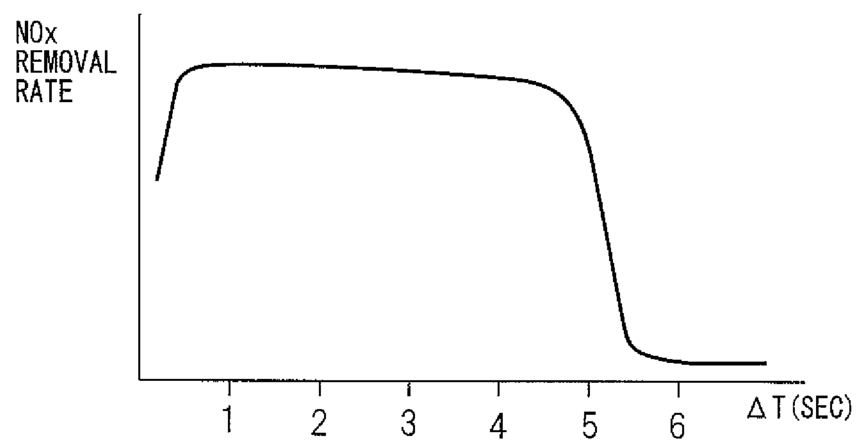
FIG. 10 is a view which shows the relationship between a hydrocarbon injection period ΔT and an NOx removal rate.

Now, as explained above, if the injection period ΔT of the hydrocarbons from the hydrocarbon feed valve 15 becomes longer, the time period during which the oxygen concentration around the active $NOx^*$ becomes higher becomes longer in the time after the hydrocarbons are injected to when the hydrocarbons are next injected. In this case, in the embodiment which is shown in FIG. 1, if the injection period ΔT of the hydrocarbons becomes longer than about 5 seconds, the active $NOx^*$ starts to be absorbed in the form of nitrates inside the basic layer 53. Therefore, as shown in FIG. 10, if the vibration period ΔT of the hydrocarbon concentration becomes longer than about 5 seconds, the NOx removal rate falls. Therefore, the injection period ΔT of the hydrocarbons has to be made 5 seconds or less.

On the other hand, in this embodiment according to the present invention, if the vibration period ΔT of the hydrocarbon concentration becomes about 0.3 second or less, the injected hydrocarbons start to build up on the exhaust gas flow surface of the exhaust purification catalyst 13, therefore, as shown in FIG. 10, if the vibration period ΔT of the hydrocarbon concentration becomes about 0.3 second or less, the NOx removal rate falls. Therefore, in the present invention, the vibration period of the hydrocarbon concentration is made from 0.3 second to 5 seconds.

Figure 15:
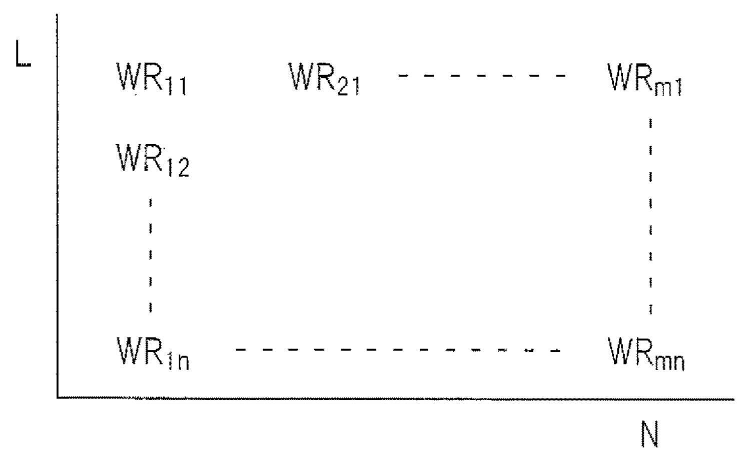
FIG. 15 is a view showing a map of a hydrocarbon feed amount WR.

Now, in an embodiment according to the present invention, control is performed so as to change the hydrocarbon injection amount and an injection timing from the hydrocarbon feed valve 15 so that the air-fuel ratio of the exhaust gas (A/F)in which flows into the exhaust purification catalyst 13 and the injection period ΔT become the optimal values in accordance with the engine operating state. In this case, in an embodiment according to the present invention, the optimum hydrocarbon injection amount W when the NOx removal action is performed by the first NOx removal method is stored as a function of the amount of depression L of the acceleration pedal 40 and engine speed N in the form of a map such as shown in FIG. 15 in advance in the ROM 32.

Further, the optimum injection period ΔT of the hydrocarbons is also stored as a function of the amount of depression L of the acceleration pedal 40 and engine speed N in the form of a map in advance in the ROM 32.

Figure 12:
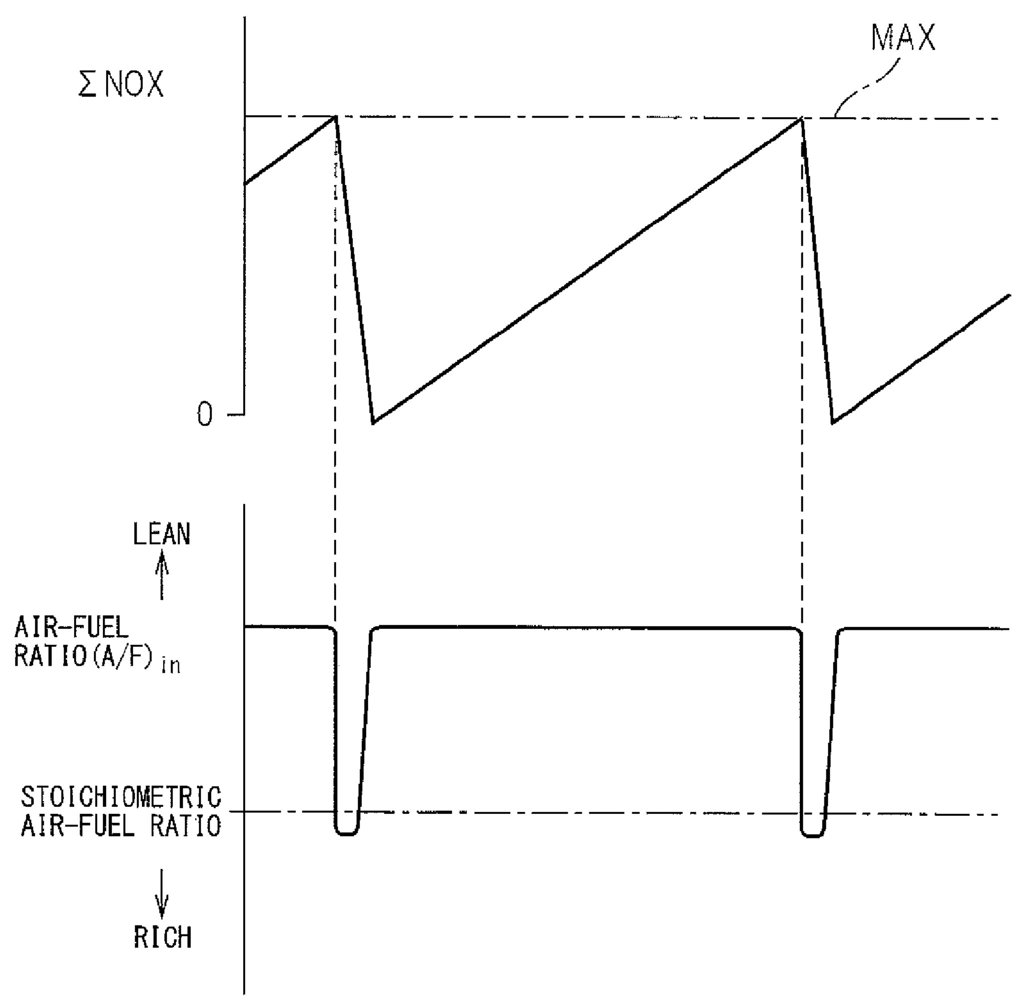
FIG. 12 is a view which shows NOx release control.

Next, referring to FIG. 12 to FIG. 15, an NOx removal method in the case when making the exhaust purification catalyst 13 function as an NOx storage catalyst will be explained in detail. The NOx removal method in the case when making the exhaust purification catalyst 13 function as an NOx storage catalyst in this way will be referred to below as the second NOx removal method. In this second NOx removal method, as shown in FIG. 12, when the stored NOx amount ΣNOX of NOx which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the NOx which was stored in the basic layer 53 when the air-fuel ratio (A/F)in of the exhaust gas was lean is released from the basic layer 53 all at once and reduced. Due to this, the NOx is removed.

Figure 13:
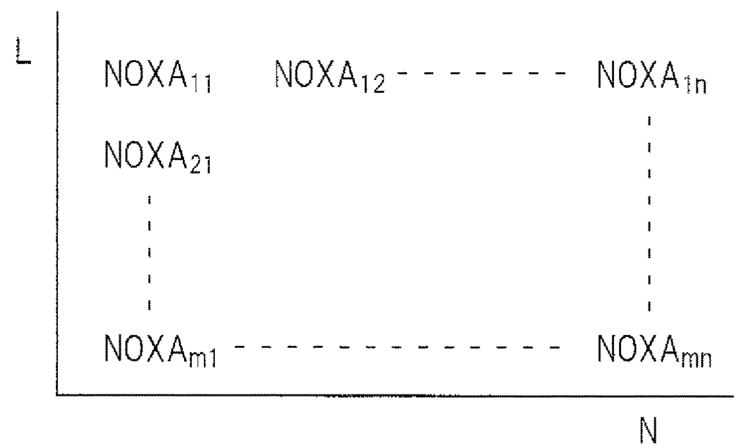
FIG. 13 is a view showing a map of an exhausted NOx amount NOXA.

The stored NOx amount ΣNOX is, for example, calculated from the amount of NOx which is exhausted from the engine. In this embodiment according to the present invention, the exhausted NOx amount NOXA which is exhausted from the engine per unit time is stored as a function of the amount of depression L of the accelerator pedal 40 and engine speed N in the form of a map such as shown in FIG. 13 in advance in the ROM 32. The stored NOx amount ΣNOX is calculated from exhausted NOx amount NOXA. In this case, as explained before, the period in which the air-fuel ratio (A/F)in of the exhaust gas is made rich is usually 1 minute or more.

Figure 14:
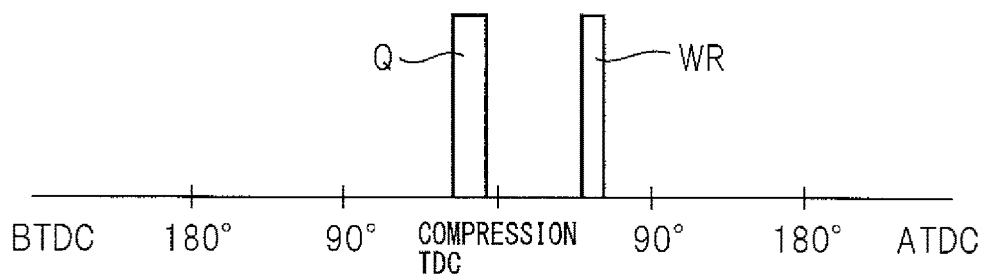
FIG. 14 is a view showing a fuel injection timing.

In this second NOx removal method, as shown in FIG. 14, the fuel injector 3 injects additional fuel WR into the combustion chamber 2 in addition to the combustion-use fuel Q so that the air-fuel ratio (A/F)in of the exhaust gas flowing into the exhaust purification catalyst 13 is made rich. Note that, FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the amount of depression L of the acceleration pedal 40 and engine speed N in the form of a map such as shown in FIG. 15 in advance in the ROM 32.

In an embodiment according to the present invention, the NOx removal action by the first NOx removal method and the NOx removal action by the second NOx removal method are selectively performed. Which of the NOx removal action by the first NOx removal method and the NOx removal action by the second NOx removal method is performed is determined for example in the following way. That is when the NOx removal action by the first NOx removal method is performed, the NOx removal rate, as shown in FIG. 5, starts to rapidly fall when the temperature TC of the exhaust purification catalyst 13 becomes the limit temperature TX or less. As opposed to this, as shown in FIG. 9, when the NOx removal action by the second NOx removal method is performed, the NOx removal rate falls relatively slowly when the temperature TC of the exhaust purification catalyst 13 falls. Therefore, in an embodiment according to the present invention, when the temperature TC of the exhaust purification catalyst 13 is higher than the limit temperature TX, the NOx removal action by the first NOx removal method is performed, while when the temperature TC of the exhaust purification catalyst 13 is lower than the limit temperature TX, the NOx removal action by the second NOx removal method is performed.

In this regard, when rich control is performed, the temperature of the exhaust gas which is exhausted from a combustion chamber 2 becomes higher. Therefore, the hydrocarbon feed valve 15 is exposed to high temperature exhaust gas. For this reason, if hydrocarbons remain at the injection port of the hydrocarbon feed valve 15, deposits are formed from the hydrocarbons and the deposits are liable to cause clogging of the injection port. Therefore, in an embodiment according to the present invention, in order to prevent clogging of the hydrocarbon feed valve 15, hydrocarbons is repeatedly injected from the hydrocarbon feed valve 15. If referring to this injection as "clogging preventing injection", the amount of hydrocarbons which is injected by the clogging preventing injection is slight and is considerably smaller than the amount of injection when the first NOx removal method is performed. Further, the clogging preventing injection is performed by a predetermined injection interval. This predetermined injection interval is determined as a function of the amount of depression L of the accelerator pedal 40 and the engine speed N.

Now, as explained above, when the second NOx removal method is performed, rich control, which makes the air-fuel ratio of the exhaust gas which is exhausted from the combustion chamber 2 rich to make the exhaust purification catalyst 13 release NOx for removal, is performed. In an embodiment according to the present invention, rich control is performed by injecting additional fuel WR into the combustion chamber 2. In this case, rich control is performed so that the air-fuel ratio (A/F)out of the exhaust gas which flows out from the exhaust purification catalyst 13 becomes the target rich air-fuel ratio. Therefore, the additional fuel amount WR which is shown in FIG. 15 is the amount of fuel which is required for making the air-fuel ratio (A/F)out of the exhaust gas which flows out from the exhaust purification catalyst 13 the target rich air-fuel ratio.

On the other hand, as explained above, the exhaust purification catalyst 13 has an oxygen storage ability. For this reason, for a little while after rich control is started, the stored oxygen is released from the exhaust purification catalyst 13. While the oxygen is being released, almost no NOx is released. In other words, time is required from when rich control is started to when NOx actually starts to be released.

Therefore, in an embodiment according to the present invention, clogging preventing injection is performed at the initial period of rich control and the clogging preventing injection in this case is performed by a shorter injection interval than the above predetermined injection interval. Next, this clogging preventing injection which is performed at the initial period of the rich control will be explained with reference to FIG. 16. Note that, in FIG. 16, the flag XR is set when rich control should be performed and is reset otherwise. That is, in an embodiment according to the present invention, the flag XR is set when the stored NOx amount ΣNOX exceeds the allowable value MAX.

Figure 16:
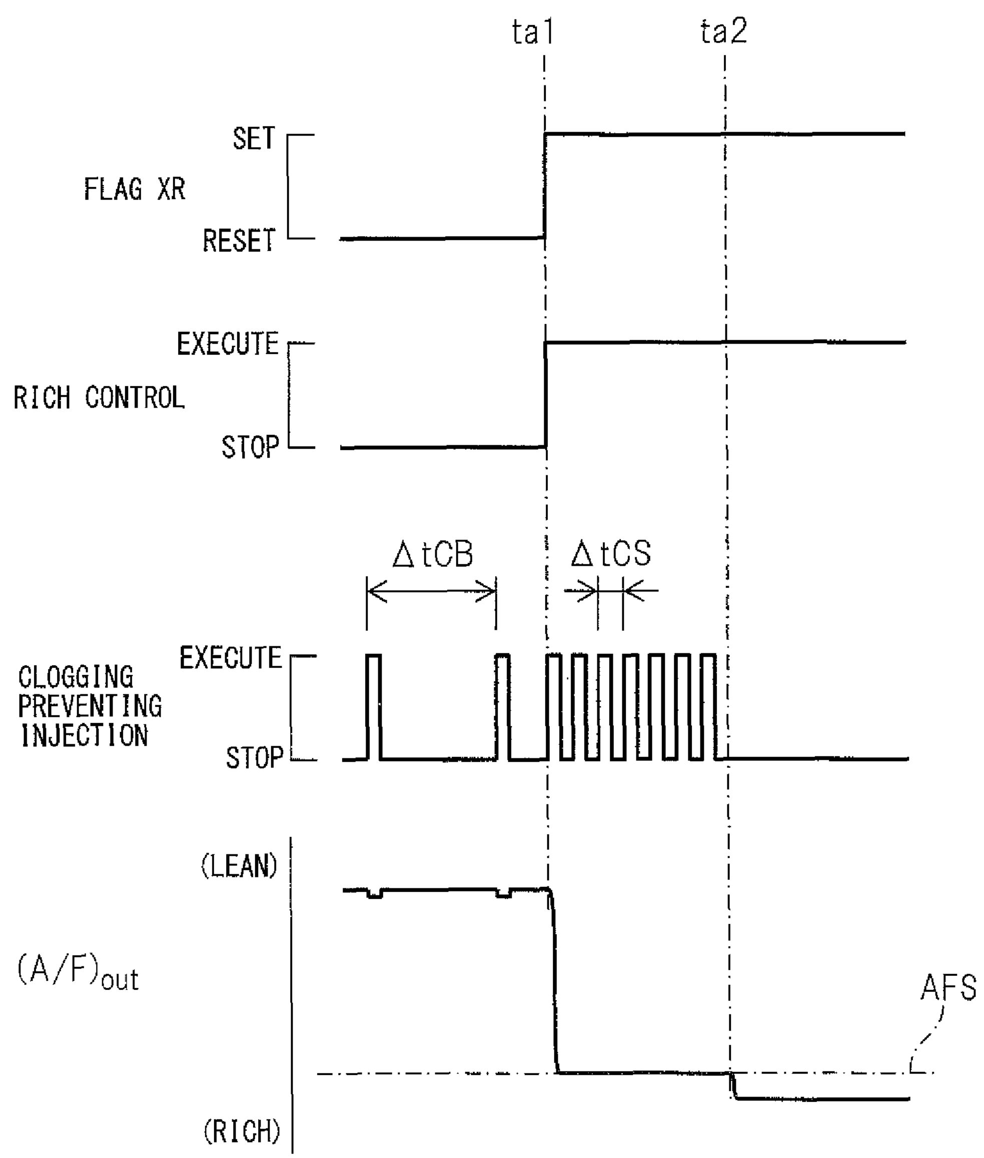
FIG. 16 is a time chart for explaining an embodiment according to the present invention.

Referring to FIG. 16, when the flag XR is reset before the time ta1, that is, when rich control is not being performed, the clogging preventing injection is performed by a predetermined injection interval ΔtCB.

Next, when the flag XR is set at the time period ta1, rich control is started. Further, clogging preventing injection is started substantially simultaneously with the rich control. In this case, the clogging preventing injection is performed by an injection interval ΔtCS which is shorter than the injection interval ΔtCB. As a result, the air-fuel ratio (A/F)out of the exhaust gas which flows out from the exhaust purification catalyst 13 falls from the lean level. While the exhaust purification catalyst 13 is releasing the stored oxygen, the air-fuel ratio (A/F)out of the outflowing exhaust gas is maintained at substantially the stoichiometric air-fuel ratio AFS.

If oxygen finishes being released from the exhaust purification catalyst 13, the air-fuel ratio (A/F)out of the outflowing exhaust gas is switched to rich. Therefore, at the time ta2, if the air-fuel ratio (A/F)out of the outflowing exhaust gas is switched to rich, the clogging preventing injection by the shorter injection interval ΔtCS is stopped.

If performing the clogging preventing injection by a shorter injection interval ΔtCS at the initial period of the rich control in this way, it is possible to prevent clogging of the hydrocarbon feed valve 15 while promoting release of oxygen from the exhaust purification catalyst 13. Therefore, the release of NOx from the exhaust purification catalyst 13 is quickly started and the rich control is quickly ended. In other words, the time required for rich control can be shortened. Further, the hydrocarbon feed valve 15 can be cooled in advance by the fuel which passes through the fuel passage in the hydrocarbon feed valve 15. Therefore, the temperature of the hydrocarbon feed valve 15 can be kept from being raised by the high temperature exhaust gas when rich control is performed.

When the clogging preventing injection at the initial period of the rich control is stopped, clogging preventing injection is stopped during the subsequent rich control. By doing this, the air-fuel ratio (A/F)out of the exhaust gas which flows out during rich control can be accurately held at the target rich air-fuel ratio. Further, the amount of hydrocarbons which flow out from the exhaust purification catalyst 13 can be reduced. If rich control ends, the clogging preventing injection is resumed by the injection interval ΔtCB.

Figure 17:
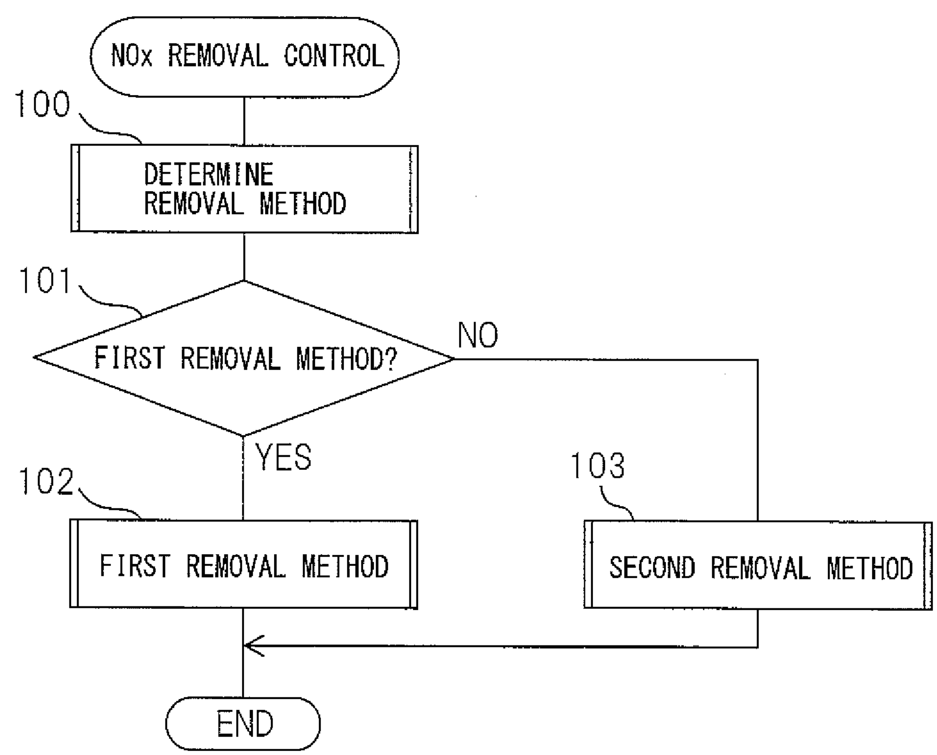
FIG. 17 is a flow chart for executing NOx removal control.

FIG. 17 shows the routine for performing the NOx removal control method of an embodiment according to the present invention. This routine is executed by interruption every certain time period.

Figure 11:
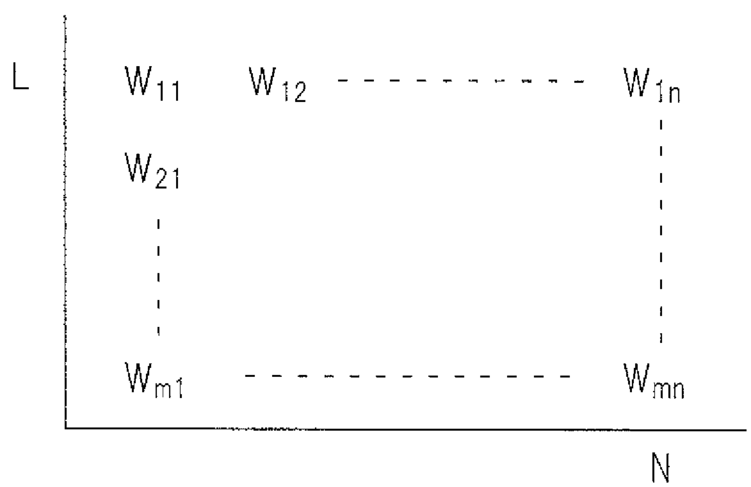
FIG. 11 is a map which shows a hydrocarbon injection amount.

Referring to FIG. 17, first, to start, at step 100, which of the NOx removal action by the first NOx removal method and the NOx removal action by the second NOx removal method to perform is decided. Next, at step 101, it is judged whether to perform the NOx removal action by the first NOx removal method. When the NOx removal action by the first NOx removal method should be performed, the routine proceeds to step 102 where the NOx removal action by the first NOx removal method is performed. That is, from the hydrocarbon feed valve 15, hydrocarbons of the injection amount W which is shown in FIG. 11 are injected by a predetermined injection period ΔT in accordance with the engine operating state.

When, at step 101, the NOx removal action by the second NOx removal method should be performed, the routine proceeds to step 103 where the routine for performing the NOx removal action by the second NOx removal method is performed. This routine is shown in FIG. 18.

Figure 18:
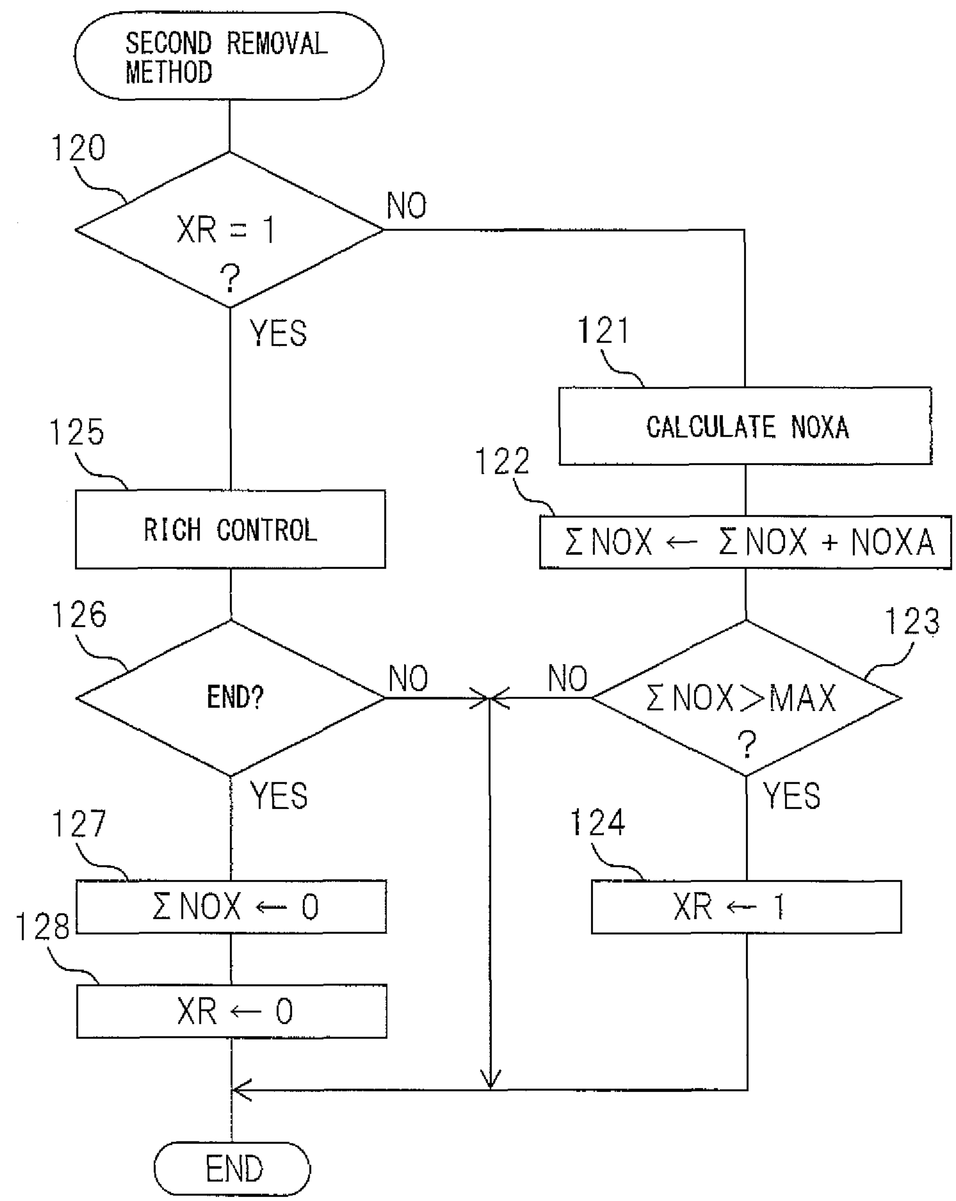
FIG. 18 is a flow chart for executing a second NOx removal method.

FIG. 18 shows the routine for performing the NOx removal action by the second NOx removal method which is performed at step 103 of FIG. 17. Referring to FIG. 18, first, to start, at step 120, it is judged if the flag XR has been set. When the flag XR has not been set, next the routine proceeds to step 121 where the exhausted NOx amount NOXA per unit time is calculated from the map which is shown in FIG. 13. Next, at step 122, the exhausted NOx amount NOXA is added to ENOX to calculate the stored NOx amount ΣNOX. Next, at step 123, it is judged if the stored NOx amount ΣNOX has exceeded the allowable value MAX. When ΣNOX>MAX, the routine proceeds to step 124 where the flag XR is set (XR=1).

If the flag XR is set, the routine proceeds from step 120 to step 125 where rich control is performed. That is, the additional fuel amount WR is calculated from the map which is shown in FIG. 15 and the action of injection of additional fuel is performed. Next, at step 126, it is judged if rich control should be ended. When rich control should be ended, next the routine proceeds to step 127 where ΣNOX is cleared. Next, at step 128, the flag XR is reset (XR=0).

Figure 19:
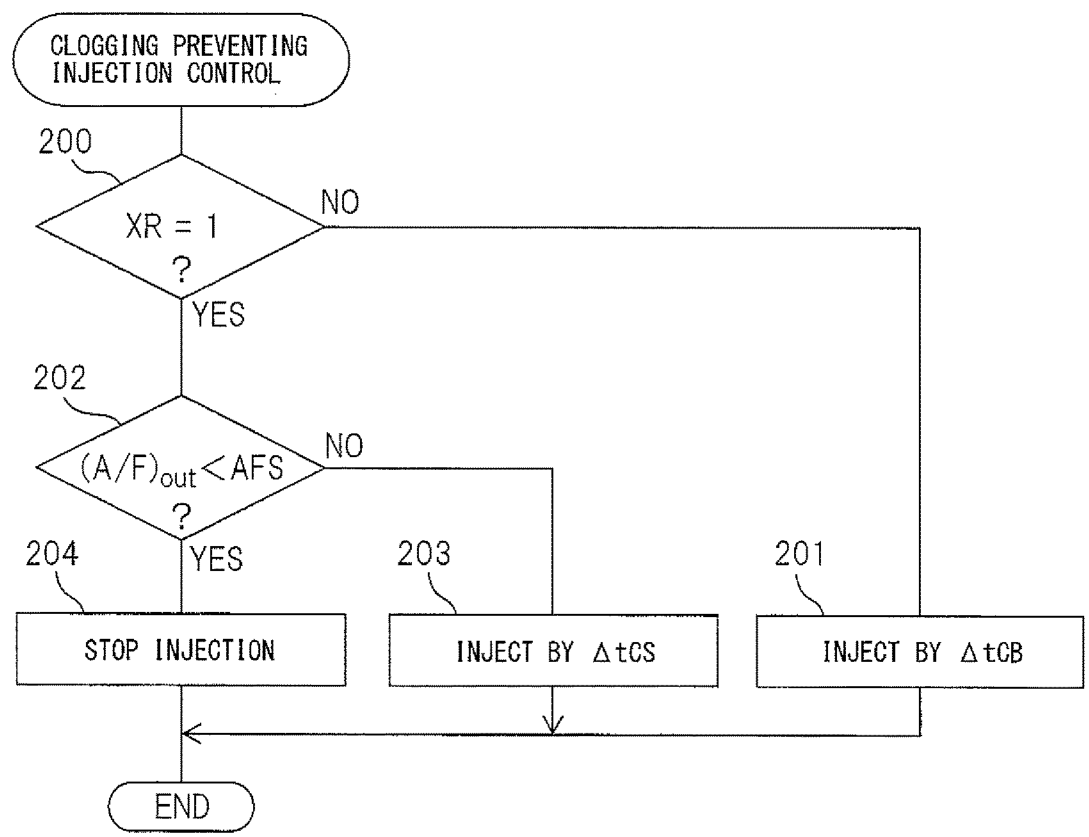
FIG. 19 is a flow chart for executing clogging preventing injection control.

FIG. 19 shows a routine for controlling clogging preventing injection in an embodiment according to the present invention. This routine is executed by interruption every certain time period.

Referring to FIG. 19, first, to start, at step 200, it is judged if the flag XR has been set. When the flag XR has not been set, the routine proceeds to step 201 where clogging preventing injection is performed by an injection interval ΔtCB. On the other hand, when the flag XR is set, the routine proceeds from step 200 to step 202 where it is judged if the air-fuel ratio (A/F)out of the exhaust gas which flows out from the exhaust purification catalyst 13 is smaller than the stoichiometric air-fuel ratio AFS, that is, it is judged if the air-fuel ratio is rich. When (A/F)out≥ASF, next the routine proceeds to step 203 where clogging preventing injection is performed by a shorter injection interval ΔtCS. If, at step 202, (A/F)out<ASF, the routine proceeds from step 202 to step 204 where the clogging preventing injection is stopped.

Figure 20:
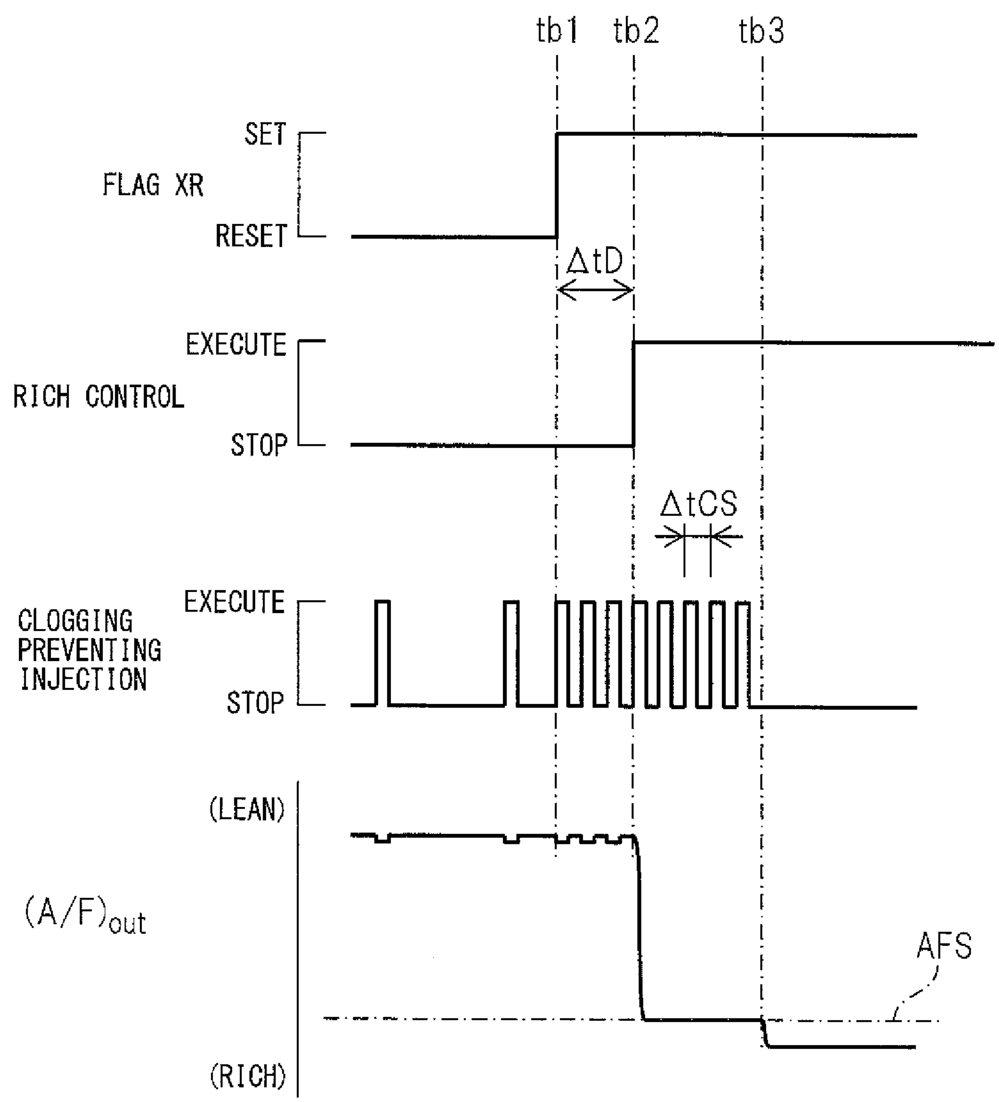
FIG. 20 is a time chart for explaining another embodiment according to the present invention.

FIG. 20 shows another embodiment according to the present invention.

Referring to FIG. 20, at the time tb1, if the flag XR is set, rich control remains stopped and clogging preventing injection is started by a shorter injection interval ΔtCS. Next, at the time tb2, if a predetermined set time ΔtD elapses, rich control is started.

That is, when rich control should be started, first, clogging preventing injection is started by a shorter injection interval ΔtCS, then rich control is started. By doing this, release of oxygen from the exhaust purification catalyst 13 can be promoted and the time required for rich control can be shortened.

Next, at the time tb3, if the air-fuel ratio (A/F)out of the outflowing exhaust gas is switched to rich, the clogging preventing injection by a shorter injection interval ΔtCS is stopped.

Figure 21:
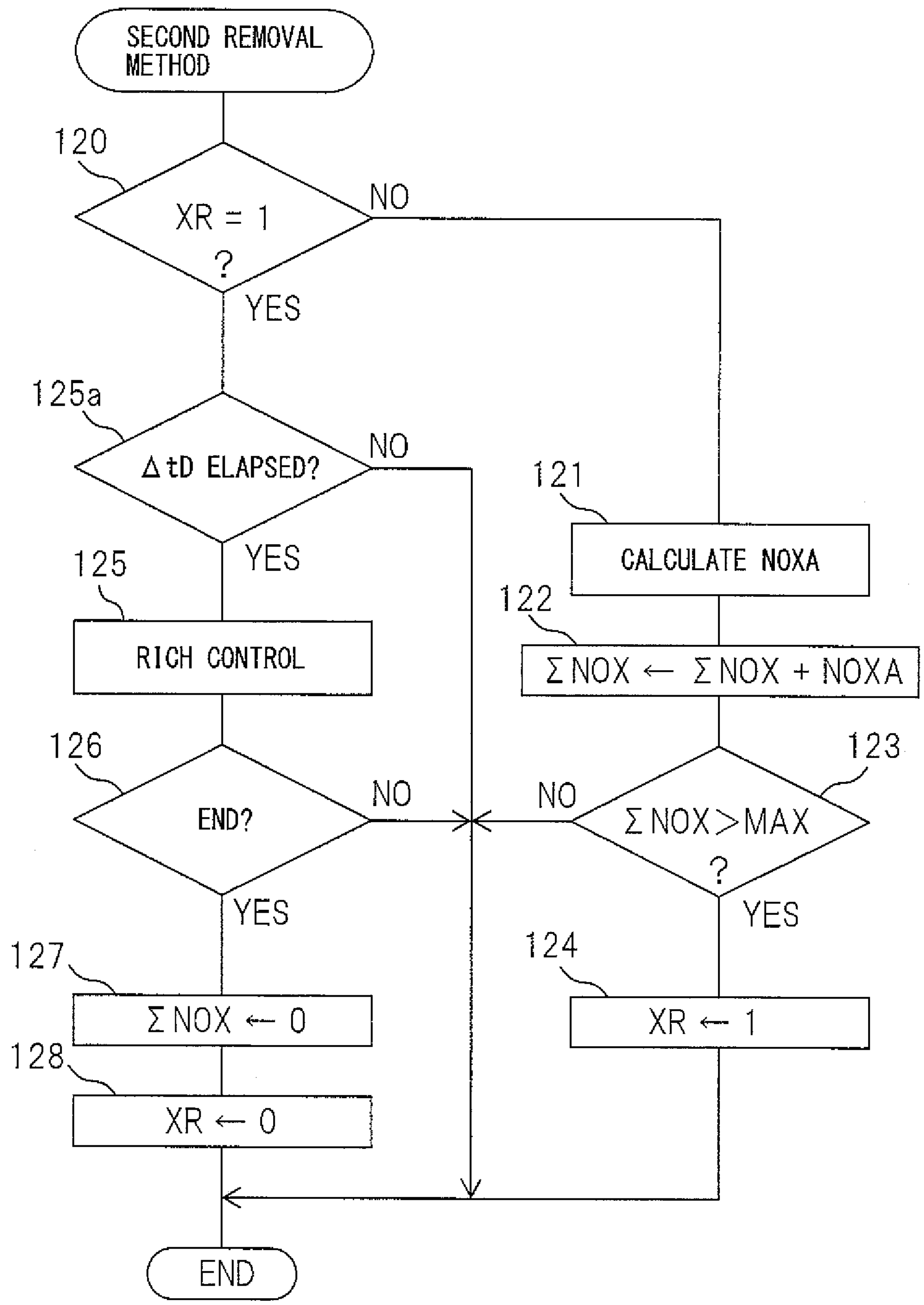
FIG. 21 is a flow chart for executing a second NOx removal method of another embodiment according to the present invention.

FIG. 21 shows the routine for executing the NOx removal action according to the second NOx removal method of another embodiment according to the present invention. This routine is executed at step 103 of FIG. 17.

Referring to FIG. 21, first, to start, at step 120, it is judged if the flag XR has been set. When the flag XR has not been set, next the routine proceeds to step 121 where the exhausted NOx amount NOXA per unit time is calculated from the map which is shown in FIG. 13. Next, at step 122, the exhausted NOx amount NOXA is added to ΣNOX whereby the stored NOx amount ΣNOX is calculated. Next, at step 123, it is judged if the stored NOx amount ΣNOX has exceeded the allowable value MAX. When ΣNOX>MAX, the routine proceeds to step 124 where the flag XR is set (XR=1).

If the flag XR is set, the routine proceeds from step 120 to step 125*a* where it is judged if a set time ΔtD has elapsed from when the clogging preventing injection by a shorter injection interval ΔtCS was started. When the set time period ΔtD has elapsed, the routine proceeds from step 125*a* to step 125 where rich control is performed. That is, the additional fuel amount WR is calculated from the map which is shown in FIG. 15 and the action of injecting additional fuel is performed. Next, at step 126, it is judged if the rich control should be ended. When the rich control should be ended, next the routine proceeds to step 127 where ΣNOX is cleared. Next, at step 128, the flag XR is reset (XR=0).

Figure 22:
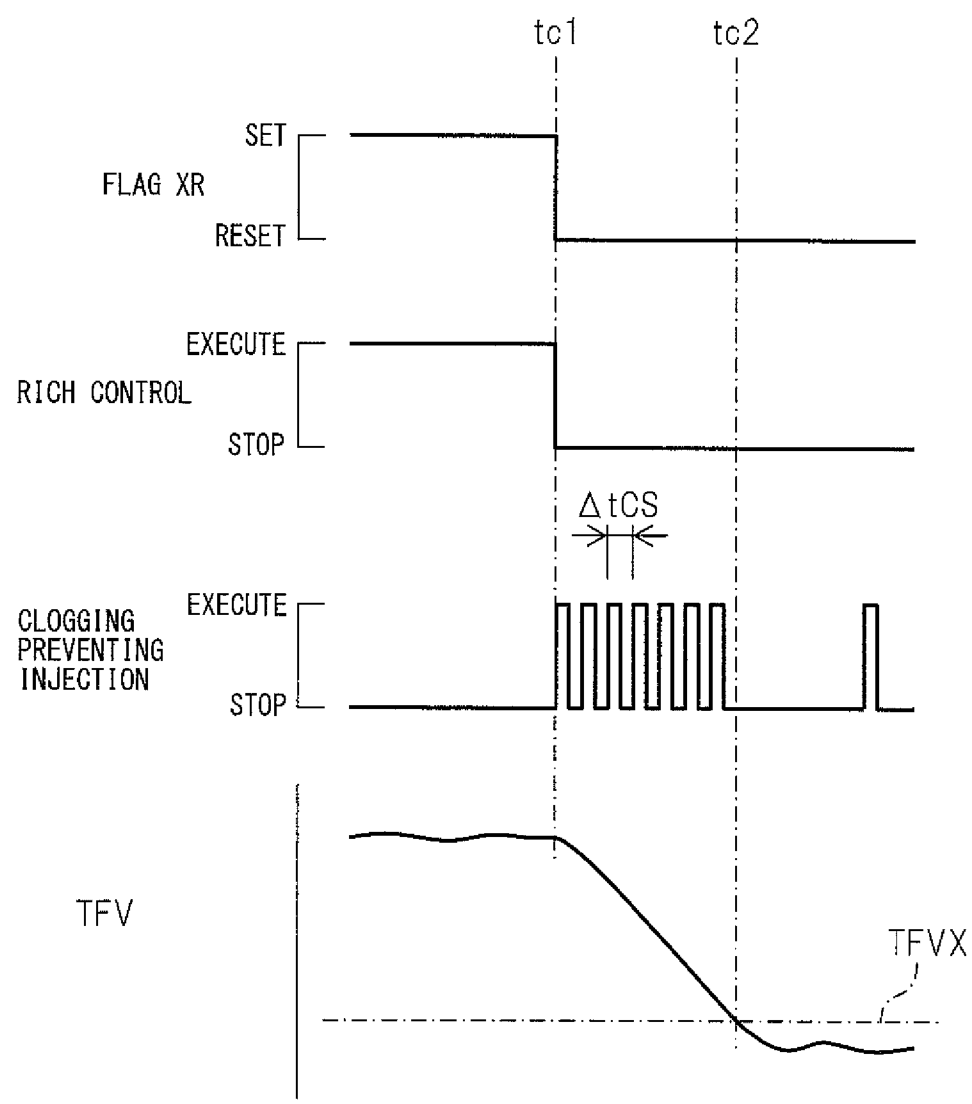
FIG. 22 is a time chart for explaining still another embodiment according to the present invention.

FIG. 22 shows still another embodiment according to the present invention.

Referring to FIG. 22, if the flag XR is reset at the time tc1, the rich control is ended. Further, the clogging preventing injection is started by a shorter injection interval ΔtCS. Next, at the time tc2, if the temperature TFV of the hydrocarbon feed valve 15 becomes lower than a threshold value TFVX, the clogging preventing injection by the shorter injection interval ΔtCS is stopped. In other words, when the rich control is ended, the clogging preventing injection by a shorter injection interval ΔtCS is temporarily performed. Next, the clogging preventing injection is resumed by the injection interval ΔtCB. Note that, the temperature TFV of the hydrocarbon feed valve 15 is detected by a temperature sensor which is provided at the hydrocarbon feed valve 15.

If doing this, the hydrocarbons which the hydrocarbon feed valve 15 are used for cooling. It is possible to prevent clogging of the hydrocarbon feed valve 15 while causing the temperature TFV of the hydrocarbon feed valve 15 to rapidly drop. As a result, when for example engine acceleration operation is performed right after rich control and the temperature of the exhaust gas rises, the temperature of the hydrocarbon feed valve 15 can be prevented from exceeding the allowable limit.

Figure 23:
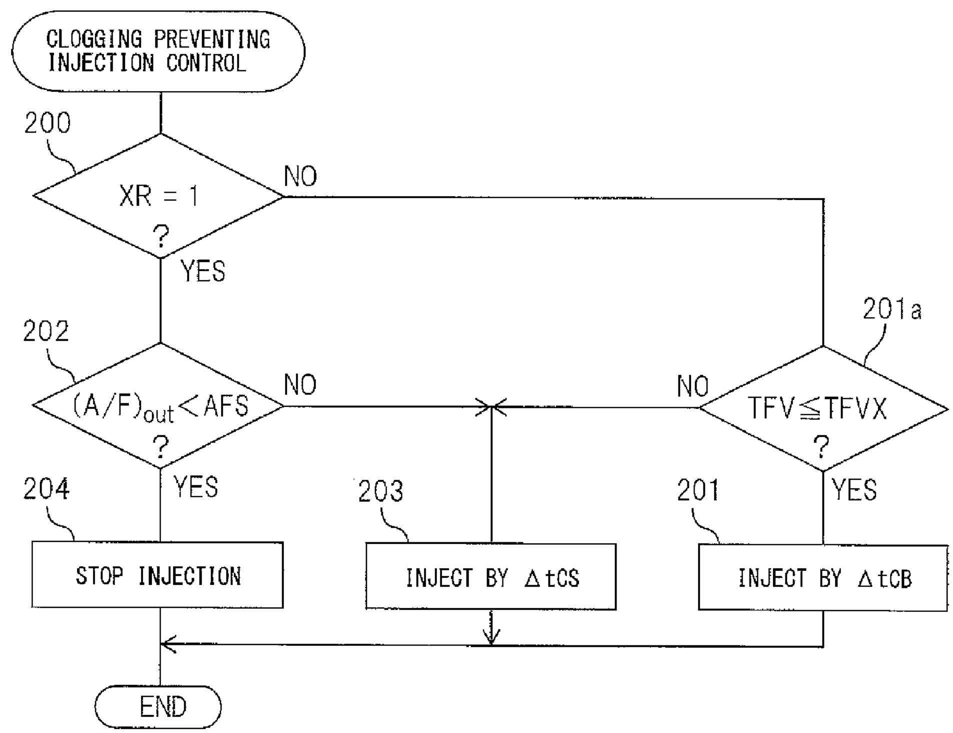
FIG. 23 is a flow chart for executing clogging preventing injection control of still another embodiment according to the present invention.

FIG. 23 shows the routine for clogging preventing injection of still another embodiment of the present invention. This routine is executed by interruption every certain time period.

Referring to FIG. 23, first, to start, at step 200, it is judged if the flag XR is seta When the flag XR is not set, next the routine proceeds to step 201*a* where it is judged if the temperature TRV of the hydrocarbon feed valve 15 is the threshold value TFVX or less. When TFV>TFVX, next the routine proceeds to step 203 where clogging preventing injection is performed by a shorter injection interval ΔtCS. As opposed to this, when TFV≤TFVX, next, the routine proceeds to step 201 where clogging preventing injection is performed by an injection interval ΔtCB. On the other hand, when the flag XR is set, the routine proceeds from step 200 to step 202 where it is judged if the air-fuel ratio of the exhaust gas (A/F)out which flows out from the exhaust purification catalyst 13 is smaller than the stoichiometric air-fuel ratio AFS, that is, is rich. When (A/F)out≥ASF, next, the routine proceeds to step 203 where clogging preventing injection is performed by a shorter injection interval ΔtCS. When, at step 202, (A/F)out<ASF, the routine proceeds from step 202 to step 204 where the clogging preventing injection is stopped.

In the embodiment according to the present invention explained up to now, if the clogging preventing injection is stopped in the initial period of the rich control, during the subsequent rich control, clogging preventing injection is stopped. In still another embodiment according to the present invention, during rich control after the clogging preventing injection is stopped in the initial period of the rich control, the clogging preventing injection is performed by an injection interval which is longer than the predetermined injection interval ΔtCB. If doing this, it is possible to prevent clogging of the hydrocarbon feed valve 15 while reducing the effect on the fuel of the clogging preventing injection.

Figure 24:
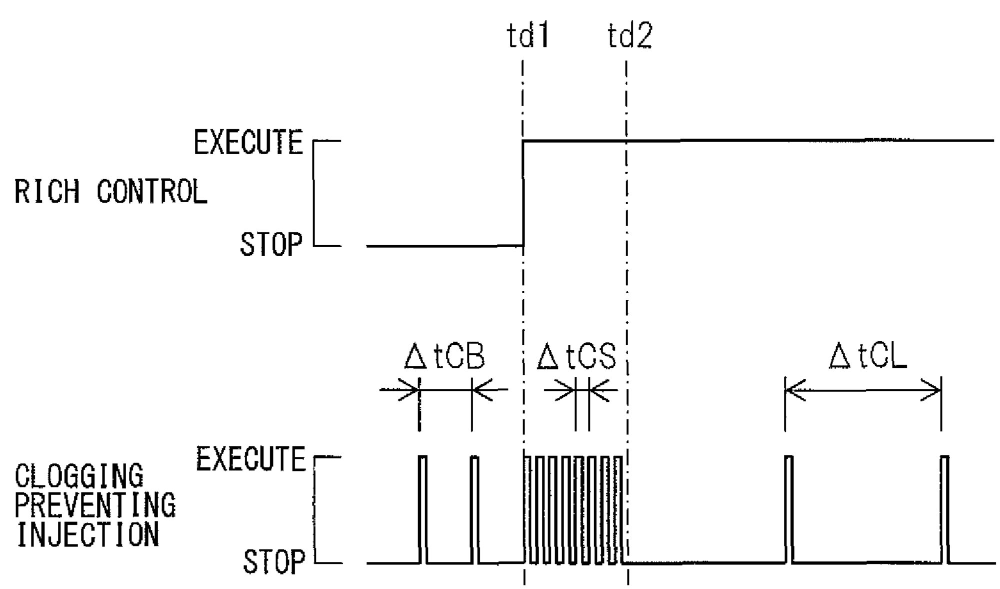
FIG. 24 is a time chart for explaining still another embodiment according to the present invention.

That is, as shown in FIG. 24, when rich control is not performed before the time td1, clogging preventing injection is performed by a predetermined injection interval ΔtCB. Next, if rich control is started at the time period td1, clogging preventing injection is started. In this case, the clogging preventing injection is performed by an injection interval ΔtCS shorter than the injection interval ΔtCB. Next, at the time td2, if the air-fuel ratio of the outflowing exhaust gas (A/F)out is switched to rich, the clogging preventing injection is stopped by a shorter injection interval ΔtCS. During the subsequent rich control, the clogging preventing injection is performed by a longer injection interval ΔtCL. In other words, the injection interval of the clogging preventing injection is extended from ΔtCS to ΔtCL. Next, if rich control ends, the clogging preventing injection is performed by the injection time interval ΔtCB.

Note that, as another embodiment, in the engine exhaust passage upstream of the exhaust purification catalyst 13, an oxidation catalyst for reforming the hydrocarbons can be arranged.

REFERENCE SIGNS LIST

- 4 intake manifold
- 5 exhaust manifold
- 7 exhaust turbocharger
- 12*a*, 12*b* exhaust pipe
- 13 exhaust purification catalyst

14 particulate filter
15 hydrocarbon feed valve
24 temperature sensor
25 air-fuel ratio sensor

The invention claimed is:

1. An exhaust purification system for an internal combustion engine, the exhaust purification system comprising:
- an engine exhaust passage;
- an exhaust purification catalyst arranged inside of the engine exhaust passage;
- a hydrocarbon feed valve arranged upstream of the exhaust purification catalyst in the engine exhaust passage; and
- an electronic control unit:
  - performs rich control which makes an air-fuel ratio of exhaust gas which is exhausted from a combustion chamber rich when the air-fuel ratio of the exhaust gas which flows into the exhaust purification catalyst should be made rich, and
  - performs a clogging preventing injection which injects hydrocarbons from the hydrocarbon feed valve by a predetermined injection interval in order to prevent clogging of the hydrocarbon feed valve, wherein:
- the exhaust purification catalyst has an oxygen storage ability and the clogging preventing injection is performed by an injection interval which is shorter than the predetermined injection interval at an initial period of the rich control, and
- when the clogging preventing injection at the initial period of the rich control is stopped, the clogging preventing injection is stopped or is performed by an injection interval longer than said predetermined injection interval, at subsequent rich control.

2. The exhaust purification system for an internal combustion engine as claimed in claim 1, wherein when the rich control should be started, the clogging preventing injection by it the injection interval shorter than said predetermined injection interval and the rich control are started substantially simultaneously.

3. The exhaust purification system for an internal combustion engine as claimed in claim 1, wherein when the rich control should be started, the clogging preventing injection by the injection interval shorter than said predetermined injection interval is started, and then the rich control is started.

4. The exhaust purification system for an internal combustion engine as claimed in claim 1, wherein when the air-fuel ratio of the exhaust gas which flows out from the exhaust purification catalyst is switched to rich, the clogging preventing injection by the injection interval shorter than said predetermined injection interval is stopped.

5. The exhaust purification system for an internal combustion engine as claimed in claim 1, wherein the exhaust purification catalyst is comprised of a catalyst which functions as an NOx storage catalyst, the air-fuel ratio of the exhaust gas flowing into the exhaust purification catalyst is made rich in order to release NOx from the exhaust purification catalyst and remove the NOx.

6. The exhaust purification system for an internal combustion engine as claimed in claim 1, wherein when the rich control is ended, the clogging preventing injection is temporarily performed by the injection interval shorter than said predetermined injection interval.

7. The exhaust purification system for an internal combustion engine as claimed in claim 6, wherein when a temperature of the hydrocarbon feed valve becomes lower than a predetermined set temperature, the clogging preventing injection by the injection interval shorter than said predetermined injection interval is stopped.

8. The exhaust purification system for an internal combustion engine as claimed in claim 1, wherein an exhaust gas flow surface of the exhaust purification catalyst carries a precious metal catalyst, basic exhaust gas flow surface parts are formed around the precious metal catalyst, said exhaust purification catalyst has the property of reducing the NOx which is contained in exhaust gas if the concentration of hydrocarbons which flow into the exhaust purification catalyst is made to vibrate within a predetermined range of amplitude and within a predetermined range of period and has the property of being increased in storage amount of NOx which is contained in exhaust gas if the vibration period of the hydrocarbon concentration is made longer than said predetermined range, and a second NOx removal method which makes the air-fuel ratio of the exhaust gas which flows into the exhaust purification catalyst rich by a period longer than said predetermined range to thereby make the exhaust purification catalyst release the stored NOx and thereby remove the NOx, is performed.

9. The exhaust purification system for an internal combustion engine as claimed in claim 8, wherein first NOx removal method which injects hydrocarbons from the hydrocarbon feed valve by a period within said predetermined range so as to remove the NOx which is contained in the exhaust gas and the second NOx removal method are selectively used.

10. An exhaust purification system for an internal combustion engine, the exhaust purification system comprising:
- an engine exhaust passage;
- an exhaust purification catalyst is arranged inside of the engine exhaust passage;
- a hydrocarbon feed valve arranged upstream of the exhaust purification catalyst in the engine exhaust passage; and
- an electronic control unit:
  - performs rich control which makes an air-fuel ratio of exhaust gas which is exhausted from a combustion chamber rich when the air-fuel ratio of the exhaust gas which flows into the exhaust purification catalyst should be made rich, and
  - performs a clogging preventing injection which injects hydrocarbons from the hydrocarbon feed valve by a predetermined injection interval in order to prevent clogging of the hydrocarbon feed valve, wherein:
- the exhaust purification catalyst has an oxygen storage ability and the clogging preventing injection is performed by an injection interval which is shorter than the predetermined injection interval at an initial period of the rich control, and
- when the air-fuel ratio of the exhaust gas which flows out from the exhaust purification catalyst is switched to rich, the clogging preventing injection by the injection interval shorter than said predetermined injection interval is stopped.

11. The exhaust purification system for an internal combustion engine as claimed in claim 10, wherein when the rich control should be started, the clogging preventing injection by the injection interval shorter than said predetermined injection interval and the rich control are started substantially simultaneously.

12. The exhaust purification system for an internal combustion engine as claimed in claim 10, wherein when the rich control should be started, the clogging preventing injection by the injection interval shorter than said predetermined injection interval is started, and then the rich control is started.

13. The exhaust purification system for an internal combustion engine as claimed in any one of claim 10, wherein when the rich control is ended, the clogging preventing injection is temporarily performed by the injection interval shorter than said predetermined injection interval.

14. The exhaust purification system for an internal combustion engine as claimed in claim 10, wherein when a temperature of the hydrocarbon feed valve becomes lower than a predetermined set temperature, the clogging preventing injection by the injection interval shorter than said predetermined injection interval is stopped.

15. The exhaust purification system for an internal combustion engine as claimed in any one of claim 10, wherein the exhaust purification catalyst is comprised of a catalyst which functions as an NOx storage catalyst, the air-fuel ratio of the exhaust gas flowing into the exhaust purification catalyst is made rich in order to release NOx from the exhaust purification catalyst and remove the NOx.

16. The exhaust purification system for an internal combustion engine as claimed in any one of claim 10, wherein an exhaust gas flow surface of the exhaust purification catalyst carries a precious metal catalyst, basic exhaust gas flow surface parts are formed around the precious metal catalyst, said exhaust purification catalyst has the property of reducing the NOx which is contained in exhaust gas if the concentration of hydrocarbons which flow into the exhaust purification catalyst is made to vibrate within a predetermined range of amplitude and within a predetermined range of period and has the property of being increased in storage amount of NOx which is contained in exhaust gas if the vibration period of the hydrocarbon concentration is made longer than said predetermined range, and a second NOx removal method which makes the air-fuel ratio of the exhaust gas which flows into the exhaust purification catalyst rich by a period longer than said predetermined range to thereby make the exhaust purification catalyst release the stored NOx and thereby remove the NOx, is performed.

17. The exhaust purification system for an internal combustion engine as claimed in claim 16, wherein first NOx removal method which injects hydrocarbons from the hydrocarbon feed valve by a period within said predetermined range so as to remove the NOx which is contained in the exhaust gas and the second NOx removal method are selectively used.

* * * * *